United States Patent
Bronfenbrenner et al.

(10) Patent No.: US 9,446,560 B2
(45) Date of Patent: *Sep. 20, 2016

(54) FAST FIRING METHOD FOR HIGH POROSITY CERAMICS

(71) Applicant: CORNING INCORPORATED, Corning, NY (US)

(72) Inventors: David Jack Bronfenbrenner, Painted Post, NY (US); Sriram Rangarajan Iyer, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/951,802

(22) Filed: Jul. 26, 2013

(65) Prior Publication Data

US 2015/0028527 A1 Jan. 29, 2015

(51) Int. Cl.
| | |
|---|---|
| *C04B 35/64* | (2006.01) |
| *C04B 38/06* | (2006.01) |
| *B29D 24/00* | (2006.01) |
| *C04B 35/195* | (2006.01) |

(Continued)

(52) U.S. Cl.
CPC .......... *B29D 24/005* (2013.01); *C04B 35/195* (2013.01); *C04B 35/62645* (2013.01); *C04B 38/0006* (2013.01); *C04B 2235/656* (2013.01); *C04B 2235/6562* (2013.01); *C04B 2235/6584* (2013.01); *C04B 2235/77* (2013.01)

(58) Field of Classification Search
CPC .................. C04B 38/0006; C04B 2235/6562; C04B 35/195

See application file for complete search history.

(56) References Cited

U.S. PATENT DOCUMENTS

| | | | |
|---|---|---|---|
| 6,225,733 B1 | 5/2001 | Gadkaree et al. | 313/352 |
| 6,541,407 B2 | 4/2003 | Beall et al. | |
| 7,976,768 B2 | 7/2011 | Brady et al. | |

(Continued)

FOREIGN PATENT DOCUMENTS

| | | |
|---|---|---|
| CN | 103517885 | 1/2014 |
| EP | 2030957 | 3/2009 |

(Continued)

OTHER PUBLICATIONS

Patent Cooperation Treaty International Notification of Transmittal of the International Search Report and The Written Opinion of the International Searching Authority, international application No. PCT/US2014/020202; mailing date May 15, 2014, 10 pages.

(Continued)

*Primary Examiner* — Erin Snelting
(74) *Attorney, Agent, or Firm* — Joseph M. Homa; Matthew B. McNutt

(57) ABSTRACT

A method for firing a green honeycomb ceramic body including heating the green honeycomb ceramic body from room temperature to a first temperature of about 300° C. The green honeycomb ceramic body is then heated from the first temperature to a second temperature of greater than or equal to about 800° C. at a heating rate of greater than or equal to about 90° C./hr. The green honeycomb ceramic body may have a diameter of from greater than or equal to about 4.0 inches to less than or equal to about 9.0 inches, and it may include a carbon-based pore former in a concentration of from greater than or equal to about 10% to less than or equal to about 45% by weight.

13 Claims, 1 Drawing Sheet

(51) Int. Cl.
*C04B 35/626* (2006.01)
*C04B 38/00* (2006.01)

(56) References Cited

U.S. PATENT DOCUMENTS

| | | | |
|---|---|---|---|
| 2006/0089525 A1 | 4/2006 | Coates et al. | 502/150 |
| 2007/0006561 A1 | 1/2007 | Brady et al. | 55/523 |
| 2007/0254798 A1 | 11/2007 | Addiego et al. | 501/119 |
| 2007/0265161 A1 | 11/2007 | Gadkaree et al. | 502/417 |
| 2008/0051554 A1 | 2/2008 | Coates et al. | 528/405 |
| 2009/0298667 A1 | 12/2009 | Addiego et al. | 501/39 |
| 2009/0298670 A1* | 12/2009 | Murtagh | C04B 35/195 501/80 |
| 2013/0269303 A1* | 10/2013 | Uoe | C04B 35/478 55/523 |
| 2014/0252695 A1 | 9/2014 | Beall et al. | |

FOREIGN PATENT DOCUMENTS

| | | |
|---|---|---|
| WO | 2004/011124 | 2/2004 |
| WO | 2006/130759 | 12/2006 |
| WO | 2012/057142 | 5/2012 |
| WO | 2012/074944 | 6/2012 |
| WO | 2014/138015 | 9/2014 |

OTHER PUBLICATIONS

Patent Cooperation Treaty International Notification of Transmittal of the International Search Report and The Written Opinion of the International Searching Authority, international application No. PCT/US2014/047720; mailing date Nov. 10, 2014, 9 pages.
Patent Cooperation Treaty International Notification of Transmittal of the International Search Report and The Written Opinion of the International Searching Authority, international application No. PCT/US2014/047713; mailing date Nov. 27, 2014, 11 pages.
EP14710764.3 Search Report Mailed Oct. 30, 2015.

* cited by examiner

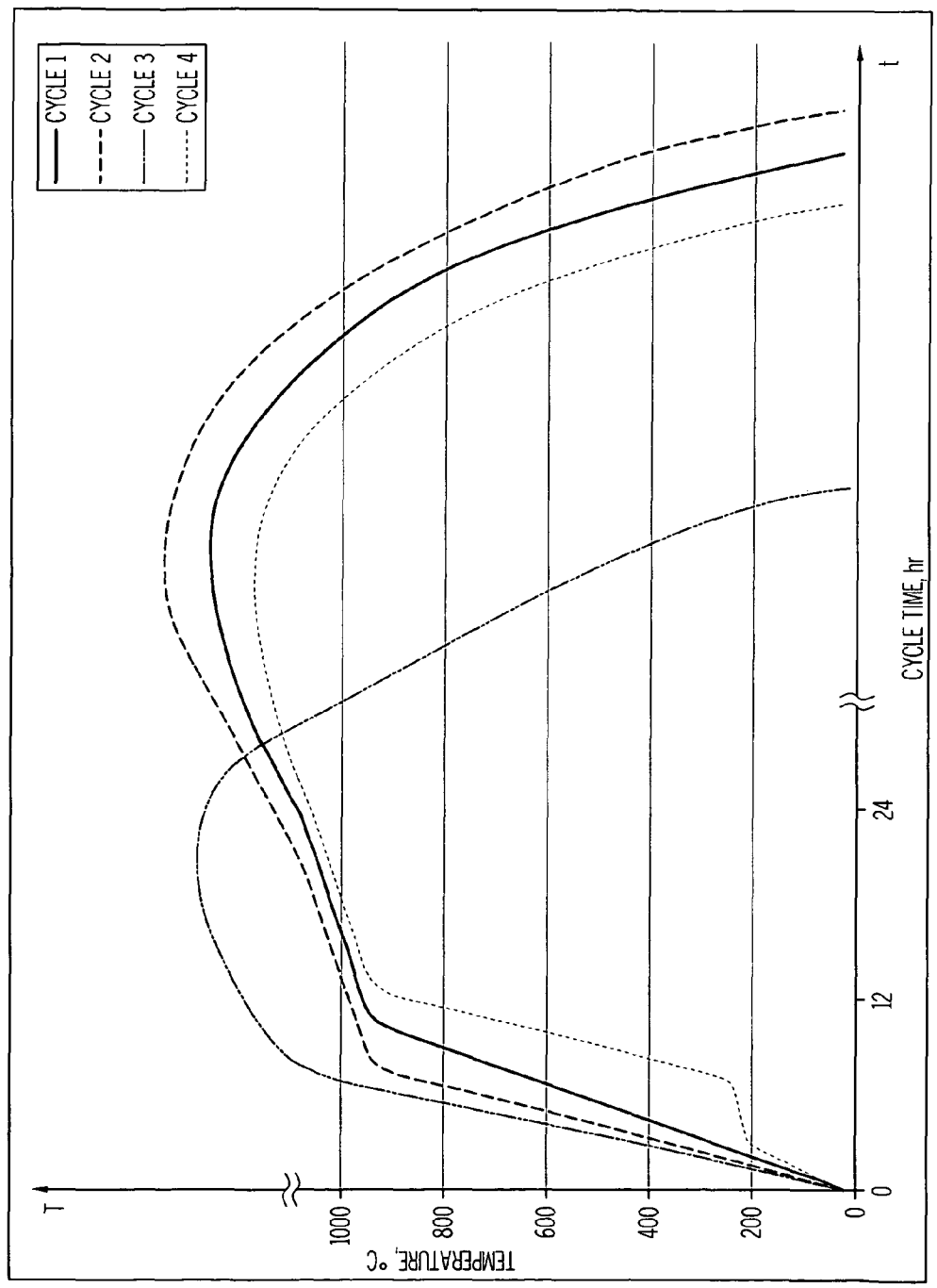

FAST FIRING METHOD FOR HIGH POROSITY CERAMICS

BACKGROUND

1. Field

The present disclosure generally relates to firing green ceramic bodies and, more specifically, to firing cordierite green ceramic bodies.

2. Technical Background

Ceramic filters, particularly large frontal area filters, include organic raw materials that should be removed in the firing process. Such organic materials may be contained in, for example, binders (Methocel, polyvinyl alcohol, etc.), lubricants, dispersant, pore formers (starch, graphite, and other polymers). These materials may be burned out in the presence of oxygen at temperatures above their flash points. Some of these materials are also removed as volatile organic compounds (VOC) that are burned in a kiln and/or in an after treatment apparatus, such as a thermal oxidizer. The decomposition and/or oxidation of these materials usually release heat and often influence shrinkage or growth of the material, which may cause stresses and ultimately lead to cracking.

Conventional firing processes for large or heavy duty ceramic bodies rely on firing cycles with slow heating rates, such as 4° C./hr to 8° C./hr, when heating to a temperature below 600° C. These low heating rates allow the raw organic raw materials to be removed gradually and completely, thereby reducing the stress in the ceramic material. However, firing cycles are prolonged by using these low heating rates, as it may take up to 130 hours to heat the green ceramic body to 600° C., and, as a result, the entire firing cycle may take from 140 hours to 198 hours.

Accordingly, a need exists for a firing cycle with increased heating rates, particularly heating rates up to 600° C. that does not cause cracking in the ceramic body.

SUMMARY

According to one embodiment a method is described for firing a green honeycomb ceramic body including heating the green honeycomb ceramic body from room temperature to a first temperature of about 300° C. The green honeycomb ceramic body is then heated from the first temperature to a second temperature of greater than or equal to about 800° C. at a heating rate of greater than or equal to about 90° C./hr. The green honeycomb ceramic body may have a diameter of from greater than or equal to about 4.0 inches to less than or equal to about 9.0 inches, and it may include a carbon-based pore former in a concentration of from greater than or equal to about 10% to less than or equal to about 45% by weight.

In another embodiment, a second method for firing a green honeycomb ceramic body is described. The method includes heating the green honeycomb ceramic body from room temperature to a first temperature of greater than or equal to about 800° C. at a heating rate that is greater than or equal about 90° C./hr. The green honeycomb ceramic body may have a diameter of from greater than or equal to about 4.0 inches to less than or equal to about 9.0 inches, and it includes a carbon-based pore former in a concentration of from greater than or equal to about 10% to less than or equal to about 45% by weight.

In each of the embodiments described above, oxygen levels in the kiln may be controlled to improve operation of the firing cycle. In embodiments, the amount of oxygen present in the kiln may be at ambient levels or higher. In other embodiments, the amount of oxygen present in the kiln may be below ambient levels.

Additional features and advantages of this disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 graphically depicts heating rates of four cycles according to embodiments of the present disclosure.

DETAILED DESCRIPTION

Reference will now be made in detail to embodiments of firing cycles for firing green honeycomb ceramic bodies. In accordance with embodiments, a method of firing green honeycomb ceramic bodies includes heating the green honeycomb ceramic body in a kiln in four stages. In embodiments, the first stage comprises heating the green honeycomb ceramic body from room temperature to a first temperature of about 300° C. at one or more heating rates. In the second stage the green honeycomb ceramic body may be heated from the first temperature to a second temperature at a heating rate greater than or equal to about 90° C./hr. In the third stage the green honeycomb ceramic body may be heated from the second temperature to a third temperature at a third heating rate. In the fourth stage the green honeycomb ceramic body may be heated to a maximum soak temperature and held for an amount of time sufficient to remove residual carbon from the green honeycomb ceramic body. The heating rates in the first, second, and third stages may be the same or different. In embodiments, more than one heating rate may be used in the first stage. In some embodiments, the heating rates in the first and second stages may vary depending on the size of the ceramic body that is being heated and the amount of oxygen present in the kiln. Various embodiments of firing cycles for firing green honeycomb ceramic bodies will be described herein with specific reference to the appended drawing.

In embodiments, the cordierite of the ceramic body may be a cordierite-type phase approximating the stoichiometry $Mg_2Al_4Si_5O_{18}$. In certain embodiments, the cordierite may have a coefficient of thermal expansion (25° C.-800° C.) of less than about $15 \times 10^{-7}/°$ C. In certain embodiments, the body may have a porosity of 40%-70%. However, it should be understood that embodiments of the method disclosed herein may be used to fire any cordierite material.

In embodiments, the cordierite composition may have a superaddition load of extrusion aids, binders, and pore formers from about 10% to about 55% or even from about 15% to about 50%. The porosity of the formed ceramic body is not particularly limited. In embodiments, the porosity of the formed ceramic body may be from about 40% to about 70%, or even from about 55% to about 65%. In embodiments, the porosity of the formed ceramic body may be about 63%.

The composition may include one or more carbon-based pore formers. In embodiments, the pore formers may be selected from starch, graphite, engineered polymeric materials, or mixtures thereof. In embodiments, the total amount of pore former superaddition included in the composition may be from greater than or equal to about 10% by weight to less than or equal to about 45% by weight of the composition. In some embodiments, the total amount of the pore former may be from greater than or equal to about 20% by weight to less than or equal to about 35% by weight of the composition. In embodiments comprising a mixture of starch and graphite, the starch may be included in the composition in an amount from greater than or equal to about 10% by weight to an amount less than or equal to about 30% by weight of the composition, and the graphite may be included in an amount from greater than or equal to 0% by weight to less than or equal to about 20% by weight of the composition. However, it should be understood that any combination of graphite and starch may be used according to embodiments.

The weight percentages of the pore former are calculated as superadditions with respect to the non-organic solids by the following formula:

$$\frac{\text{Weight of Pore Former}}{\text{Weight of Non-Organic Solids}} \times 100.$$

As will be discussed below, the desired size of the honeycomb ceramic body may affect the heating rates within each of the three stages. In embodiments, lower heating rates may be used on larger green honeycomb ceramic bodies, and higher heating rates may be used on smaller green honeycomb ceramic bodies. In some embodiments, multiple heating rates may be used in the first stage to help prevent cracking green honeycomb ceramic body during that the first stage of the process. In embodiments, the diameter of the honeycomb ceramic body may be from greater than or equal to about 4.0 inches to less than or equal to about 9.0 inches, or even from greater than or equal to about 5.0 inches to less than or equal to about 7.0 inches. In some embodiments, the fired honeycomb ceramic body may have a diameter of about 4.5 inches and a length of about 5.0 inches, or even a diameter of about 4.5 inches and a length of about 7.0 inches. In other embodiments, the fired honeycomb ceramic body may have a diameter of about 5.5 inches and a length of about 7.0 inches, or even a diameter of about 6.4 inches and a length of about 7.0 inches. In another embodiment, the fired honeycomb ceramic body may have a diameter of about 8.0 inches and a length of about 7.0 inches.

First Stage

In embodiments, the first stage of the firing method may include heating a green honeycomb ceramic body from room temperature to a first temperature of about 300° C. It should be understood that, as used herein, room temperature is not particularly limited and may include any ambient temperature of the ceramic body and/or heating apparatus prior to commencement of the first stage of the firing method.

According to some embodiments, the first stage may include one heating rate, and in other embodiments, the first stage may include multiple heating rates. At least one heating rate used in the first stage may be sufficiently high to avoid cracking of the honeycomb ceramic body. In embodiments, at least one heating rate used in the first stage may be greater than or equal to about 90° C./hr. For example, in some embodiments a heating rate used in the first stage may be greater than or equal to about 100° C./hr, or even greater than or equal to 125° C./hr. In embodiments, a heating rate used in the first stage may be less than or equal to about 150° C./hr, or even less than or equal to about 125° C./hr. In some embodiments, a heating rate used in the first stage may be about 90° C./hr, about 125° C./hr, or about 150° C./hr.

As noted above, according to some embodiments, more than one heating rate may be used in the first stage. Using more than one heating rate in the first stage may allow for better control of ΔT during the first heating stage. Thus, particularly for large honeycomb ceramic bodies, using multiple heating rates in the first stage may reduce the amount of cracking in the ceramic body. According to such an embodiment, the green honeycomb ceramic body may be heated from room temperature to a temperature of from about 150° C. to about 205° C. In embodiments, the green honeycomb ceramic body may be heated from room temperature to a temperature of about 200° C. In some embodiments, the green honeycomb ceramic body may be heated from room temperature to a temperature of from about 150° C. to about 205° C. at a heating rate that is greater than or equal to about 60° C./hr and less than or equal to about 80° C./hr. In some embodiments, the green honeycomb ceramic body may be heated from room temperature to a temperature of from about 150° C. to about 205° C. at a heating rate of about 70° C./hr.

The green honeycomb ceramic body may then be heated from the temperature of from about 150° C. to about 205° C. to a temperature of from about 215° C. to about 250° C. In some embodiments, the green honeycomb ceramic body may be heated from the temperature of from about 150° C. to about 205° C. to a temperature of about 235° C. The green honeycomb ceramic body may then be heated from the temperature of from about 150° C. to about 205° C. to a temperature of from about 215° C. to about 250° C. at a heating rate less than or equal to about 20° C./hr. In some embodiments, the heating rate for heating the green honeycomb ceramic body from the temperature of from about 150° C. to about 205° C. to a temperature of from about 215° C. to about 250° C. may be less than or equal to about 15° C./hr, or even less than or equal to about 10° C./hr. In an embodiment, the green honeycomb ceramic body may be heated from the temperature of from about 150° C. to about 205° C. to a temperature of from about 215° C. to about 250° C. at a heating rate less of about 8° C./hr.

According to embodiments, the green honeycomb ceramic body may be heated from the temperature of from about 215° C. to about 250° C. to the first temperature of about 300° C. at a heating rate greater than or equal to about 90° C./hr. In some embodiments, the green honeycomb ceramic body may be heated from the temperature of from about 215° C. to about 250° C. to the first temperature of about 300° C. at a heating rate from greater than or equal to about 90° C./hr to a heating rate less than or equal to about 150° C./hr. In an embodiment, the green honeycomb ceramic body may be heated from the temperature of from about 215° C. to about 250° C. to the first temperature of about 300° C. at a heating of about 125° C./hr.

As discussed in U.S. Provisional Patent Application Ser. No. 61/775,027 entitled "Fast Firing Method for Ceramics" and filed on Mar. 8, 2013, which is incorporated herein by reference, the heating rate in the first stage may depend on the size of the honeycomb ceramic body that is being fired. For example, small-sized honeycomb ceramic bodies may be heated at high heating rates, while larger honeycomb ceramic bodies may be heated at lower heating rates. According to embodiments, using relatively high first stage heating rates may promote crack-free firing. Heating rates in the first stage may be very high in comparison to known firing methods, such as the heating rates mentioned above. These higher heating rates differ from conventional understanding, where such high heating rates may be expected to cause cracking due to increased thermal gradients. Without being bound to any specific theory, such high thermal gradients may be reached without cracking because the high heating rates in combination with low oxygen access (either through low $O_2$ or reduced reaction time) may suppress binder and pore former reactions that could lead to shrinkage. Therefore, the impact of high thermal gradients may be minimized due to low differential shrinkage. Additionally, the high heating rates may also promote uniform reactions through green bodies. At lower heating rates, green bodies may show high oxygen reaction pathways for the skin portion and low oxygen reaction pathways for the core portions. This may also contribute to low differential shrinkage within the green body during the first stage. Even if cracking is avoided in the first stage, this does not eliminate susceptibility to cracking in subsequent stages. Subsequent stages may need to be managed through more conventional means, such as different heating rates and $O_2$ level control. Further, the size of the honeycomb ceramic body that is being fired may be taken into account to help control cracking and to modify heating rates It should be understood that large temperature differentials between the surface of a honeycomb ceramic body and the core of a honeycomb ceramic body ($\Delta T$) may increase stresses and, thus, increase the likelihood that the honeycomb ceramic body will crack. High stresses in the honeycomb ceramic body may occur at kiln temperatures where $\Delta T$ is at a maximum. However, stresses in the honeycomb ceramic body may not be significantly large in the first stage of the method for firing the honeycomb ceramic body and, thus, high heating rates and thermal gradients may be used in the first stage of the firing method without introducing large amounts of stress which may ultimately crack the body.

In embodiments, the maximum heating rate in the first stage for a ceramic body having a diameter of less than or equal to about 5.6 inches may be less than or equal to about 150° C./hr. In embodiments, the maximum heating rate in the first stage for a ceramic body having a diameter of less than or equal to about 8.0 inches may be less than or equal to about 125° C./hr.

As noted above, heating rates in the first stage may depend on the size of the honeycomb ceramic body that is being fired. According to embodiments, using relatively high first stage heating rates may promote crack-free firing. Heating rates in the first stage may be very high in comparison to known firing methods, such as the heating rates mentioned above. These higher heating rates differ from conventional understanding, where such high heating rates may be expected to cause cracking due to increased thermal gradients. Without being bound to any specific theory, high thermal gradients caused by the higher heating rates may be reached without cracking because the high heating rates in combination with low oxygen access (either through low $O_2$ or reduced reaction time) may suppress binder and pore former reactions that could lead to shrinkage. Therefore, the impact of high thermal gradients may be minimized due to low differential shrinkage. Additionally, the high heating rates may also promote uniform reactions through green bodies. At lower heating rates, green bodies may show high oxygen reaction pathways for the skin portion and low oxygen reaction pathways for the core portions. This may also contribute to low differential shrinkage within the green body during the first stage. Even if cracking is avoided in the first stage, this does not eliminate susceptibility to cracking in subsequent stages. Subsequent stages may need to be managed through more conventional means, such as different heating rates and $O_2$ level control. Further, the size of the honeycomb ceramic body that is being fired may be taken into account to help control cracking and to modify heating rates.

The oxygen level of the atmosphere within the heating apparatus during the first stage may be kept low. Theoretically, using a high heating rate in the first stage may allow higher amounts of oxygen to be present in the first stage of the firing methods described herein compared to conventional firing processes for honeycomb ceramic bodies. Rapid heating of the green honeycomb ceramic body in the first stage, according to embodiments, may not allow oxygen to react with residual elements in the green honeycomb ceramic body before the temperature of the green honeycomb ceramic body reaches the temperatures of the second or third stages. In embodiments, the amount of oxygen in the atmosphere of the heating apparatus in the first stage may be about 5% by volume to about 8% by volume. In some other embodiments, the amount of oxygen in the atmosphere of the kiln in the first stage may be about 6%, or even about 7%. The amount of oxygen in the atmosphere of the kiln in the first stage is generally lower than an amount of oxygen used in a conventional firing processes for honeycomb ceramic bodies.

Oxygen levels in the atmosphere of the kiln may be controlled by any suitable means. In embodiments, the level of oxygen in the atmosphere of the kiln may be modified by injecting oxygen into the kiln. In other embodiments, the level of oxygen in the atmosphere of the kiln may be modified by using different types of setters. For example, in embodiments, the setter may be composed of silicon carbide. In other embodiments, the setter may be composed of the same material as the green honeycomb ceramic body that is being fired. The geometry of the setter may also contribute to the oxygen levels in the atmosphere of the kiln. For example, in embodiments, the setter may be a solid plate having any suitable thickness. In other embodiments, the setter may be a plate having holes formed therein; the holes may be present in any suitable number or any suitable geometry. In yet other embodiments, the setter may be ring shaped. It should be understood that other setter compositions and geometries may be used without deviating from the scope of this disclosure.

Second Stage

In embodiments, the second stage of the firing method may include heating the green honeycomb ceramic body from the maximum temperature reached in the first stage to a second temperature of greater than or equal to about 800° C. In some embodiments, the second stage of the method may include heating the green honeycomb ceramic body from the maximum temperature reached in the first stage to a second temperature that is less than or equal to about 1000° C. In some other embodiments, the second stage of the firing method may include heating the green honeycomb ceramic body from the maximum temperature reached in the first stage to a temperature of about 900° C.

The heating rate in the second stage may depend on the size of the honeycomb ceramic body that is being fired. As previously discussed, larger honeycomb ceramic bodies may likely have a larger ΔT, while smaller honeycomb ceramic bodies may likely have a smaller ΔT at an identical heating rate. Although stresses and ΔT in the honeycomb ceramic body may be higher in the second stage than in the first stage, stresses and ΔT may not be significantly large in the second stage and, thus, relatively high heating rates may still be used in the second stage of the firing method according to embodiments, particularly when smaller-sized honeycomb ceramic bodies are being fired. In embodiments, the heating rate in the second stage may be greater than or equal to about 90° C./hr. In embodiments, the heating rate in the second stage may be less than or equal to about 150° C./hr, or even less than or equal to 125° C./hr. In other embodiments, the heating rate in the second stage may be about 90° C./hr, or even about 125° C./hr. In some embodiments, the heating rate in the second stage may be about 150° C./hr.

In embodiments, the maximum heating rate in the second stage for a ceramic body having a diameter of less than or equal to about 5.6 inches may be less than or equal to about 150° C./hr. In embodiments, the maximum heating rate in the second stage for a ceramic body having a diameter of less than or equal to about 8.0 inches may be less than or equal to about 125° C./hr.

The heating rate in the second stage may be the same as the maximum heating rate in the first stage. Accordingly, the amount of oxygen in the atmosphere of the kiln during the second heating stage is not particularly limited, and may be set to ambient conditions. In embodiments, the amount of oxygen in the atmosphere of the heating apparatus during the second stage may be from about 4% to about 15% by volume, or even from about 7% to about 13% by volume. In some embodiments, the amount of oxygen in the atmosphere of the heating apparatus during the second stage may be at the maximum set point of the heating apparatus, which may be below ambient conditions.

In embodiments, the heating rate in the second stage may be the same as the maximum heating rate used in the first stage. Accordingly, in embodiments where a single heating rate is used in the first stage, the heating rate in the second stage may be the same as the heating rate in the first stage. In such embodiments, the green honeycomb ceramic body may be heated from room temperature to a first temperature that is greater than or equal to 800° C. In some embodiments, the green honeycomb ceramic body may be heated from room temperature to a first temperature that is less than or equal to about 1000° C., or even less than or equal to about 900° C. In embodiments, the green honeycomb ceramic body may be heated from room temperature to the first temperature, which is greater than or equal to about 800° C., at a heating rate that is greater than or equal to 90° C. In some embodiments, the heating rate may be less than or equal to about 150° C./hr, or even less than or equal to about 125° C./hr. In such embodiments, the amount of oxygen in the second stage may be from about 4% to about 15% by volume, or even from about 7% to about 13% by volume. In some embodiments, the amount of oxygen in the atmosphere of the heating apparatus during the second stage may be at the maximum set point.

Third Stage

In embodiments, the third stage of the firing method described herein may include heating the green honeycomb ceramic body from the maximum temperature reached in the second stage to a third temperature. The third temperature may be greater than or equal to 1050° C., or even greater than or equal to about 1100° C. In embodiments, the third temperature may be about 1200° C.

The highest stresses in the honeycomb ceramic body and the highest ΔT may occur within the temperature ranges of the third stage. Thus, in embodiments, heating rates in the third stage may be sufficiently lower than heating rates in the first and second stages to decrease the rate of change in ΔT and, thereby, reduce stresses that may cause cracking of the honeycomb ceramic body.

The heating rate in the third stage may be sufficient to remove carbonaceous material remaining in the green honeycomb ceramic body after it has been heated to the second temperature. In embodiments, the heating rate in the third stage may be less than a heating rate used in the first and second stages. In embodiments, the heating rate in the third stage may be less than or equal to about 70° C./hr, or even less than or equal to about 50° C./hr. In some embodiments, the heating rate in the third stage may be greater than or equal to 60° C./hr. In some embodiments, the heating rate in the third stage may be less than or equal to about 25° C./hr, or even less than or equal to about 20° C./hr. In some other embodiments, the heating rate in the third stage may be less than or equal to about 15° C./hr, including an isothermal hold. In some embodiments where the heating rate in the second stage is about 150° C./hr, the heating rate in the third stage may be from greater than or equal to about 50° C./hr to less than or equal about 70° C./hr, or even from greater than or equal to about 60° C./hr to less than or equal to about 66° C./hr. In some embodiments where the heating rate in the second stage is less than or equal to about 125° C./hr, the heating rate in the third stage may be less than or equal to about 50° C./hr, or even less than or equal to about 20° C./hr, including an isothermal hold.

The size of the honeycomb ceramic body does not necessarily affect the heating rate in the third stage, thus all sizes of honeycomb ceramic bodies may be heated at the same heating rate during the third stage. However, the heating rate in the third stage may be lower for larger honeycomb ceramic bodies than for smaller honeycomb ceramic bodies to decrease a rate of change in ΔT, which, as discussed above, may be larger for large honeycomb ceramic bodies. For example, the maximum heating rate in the third stage for a ceramic body having a diameter of less than or equal to about 5.6 inches may be less than or equal to about 70° C./hr. In embodiments, the maximum heating rate in the third stage for a ceramic body having a diameter of less than or equal to about 8.0 inches may be less than or equal to about 20° C./hr.

The heating rate in the third stage may be at a low level (i.e., at or below a heating rate in the first stage) such that, as with the second stage, oxygen levels in the atmosphere of the kiln in the third stage are not particularly limited and may be at ambient levels. Accordingly, in embodiments, the amount of oxygen in the atmosphere of the kiln during the third stage may be from about 5% to about 15% by volume, such as from about 8% to about 13%.

Fourth Stage

In embodiments, the fourth stage of the firing method may include heating the honeycomb ceramic body from the maximum temperature in the third stage to a maximum soak temperature. The maximum soak temperature may be greater than about 1200° C. or even greater than about 1300° C. In some embodiments, the maximum soak temperature may be greater than about 1400° C. The honeycomb ceramic body may be held at the maximum soak temperature for a predetermined length of time. The duration of the hold at the maximum soak temperature is not particularly limited and may be as long as required to form appropriate properties. After it is heated to the maximum soak temperature, the honeycomb ceramic body may be cooled to room temperature at ambient conditions. This cooling may be conducted by removing the honeycomb ceramic body from the heating apparatus, or by allowing ambient air to flow in and/or through the kiln.

For the purposes of describing and defining the embodiments herein, it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

As used herein, when directed to a measurement in inches, the term "about" may include the stated measurement ±0.25 inches.

References herein to temperatures and heating rates refer to the atmospheric temperature within the heating apparatus. As used herein, when directed to temperatures, the term "about" may include the stated temperature ±10° C.

As used herein, when directed to heating rates, the term "about" may include the stated heating rate ±10%.

Further, the amount of oxygen used in each stage and the amount of pore formers used is listed in Table 1. Each of Examples 1-6 is a cordierite composition.

TABLE 1

| | Heating Rate | | | Oxygen Level (%) | | | Part | | | |
|---|---|---|---|---|---|---|---|---|---|---|
| Ex | RT-300° C. (° C./hr) | 300° C.-800° C. (° C./hr) | 800° C. and above | 300° C. and below | 300° C.-800° C. | 800° C. and above | Size | Porosity (%) | Starch (%) | Graphite (%) |
| 1 | 90 | 90 | 800° C.-900° C.: 90° C./hr 900° C.-1200° C.: 14° C./hr | 7 | Ramp from 7 to 13 | Maximum Setpoint | 5.66" × 7" 4.66" × 7" | 63 | 26 | 16 |
| 2 | 125 | 125 | 800° C.-1200° C.: 14° C./hr | 7 | Ramp from 7 to 13 | Maximum Setpoint | 5.66" × 7" | 63 | 26 | 16 |
| 3 | 125 | 125 | 800° C.-900° C.: 125° C./hr 900° C.-1200° C.: 14° C./hr | 8 | Maximum Setpoint | Maximum Setpoint | 5.66" × 7" 8" × 7" 4.66" × 7" | 63 | 26 | 16 |
| 4 | 150 | 150 | 800° C.-1000° C.: 150° C./hr 1000° C.-1200° C.: 66° C./hr | Maximum Setpoint | Maximum Setpoint | Maximum Setpoint | 5.66" × 7" | 50 | 10 | 0 |
| 5 | 150 | 150 | 800° C.-1000° C.: 150° C./hr 1000° C.-1200° C.: 66° C./hr | Maximum Setpoint | Maximum Setpoint | Maximum Setpoint | 5.66" × 7" | 50 | 10 | |
| 6 | RT-200° C.: 70° C./hr 200° C.-235° C.: 8° C./hr 235° C.-300° C.: 125° C./hr | 125 | 800° C.-900° C.: 125° C./hr 900° C.-1200° C.: 14° C./hr | 7 | Ramp from 7 to 13 | Maximum Setpoint | 5.66" × 7" 8" × 7" 4.66" × 7" 4.66" × 5" | 55 63 | 18 26 | 5 16 |

EXAMPLES

Embodiments will be further clarified by the following examples.

Examples 1-6

In the examples below, cylindrical honeycomb ceramic bodies having diameters indicated in Table 1 below are heated in a kiln at heating rates as indicated in Table 1.

Each of the honeycomb ceramic bodies formed in accordance with the parameters shown in Table 1 above was fired without substantial cracking and at fast firing rates. The firing cycles shown in Table 1 are depicted graphically in FIG. 1, where: Example 1 is depicted as Cycle 1; Examples 2 and 3 are depicted as Cycle 2; Examples 4 and 5 are depicted as Cycle 3, and Example 6 is depicted as Cycle 4.

It will be apparent to those skilled in the art that various modifications and variations may be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for firing a green honeycomb ceramic body, the method comprising:
    heating the green honeycomb ceramic body from room temperature to a first temperature of about 300° C.; and
    heating the green honeycomb ceramic body from the first temperature to a second temperature of greater than or equal to about 800° C. at a heating rate of greater than or equal to about 90° C./hr,
    wherein the green honeycomb ceramic body has a diameter of from greater than or equal to about 4.0 inches to less than or equal to about 9.0 inches,
    wherein the green honeycomb ceramic body comprises a carbon-based pore former in a concentration of from greater than or equal to about 10% to less than or equal to about 45% by weight, and
    wherein heating the green honeycomb ceramic body from the first temperature to the second temperature comprises a different heating rate than a heating rate during heating the green honeycomb ceramic body from room temperature to the first temperature.

2. The method of claim 1, wherein heating the green honeycomb ceramic body from room temperature to the first temperature comprises:
heating the green honeycomb ceramic body from room temperature to a temperature of from about 215° C. to about 250° C.; and
heating the green honeycomb ceramic body from the temperature of from about 215° C. to about 250° C. to the first temperature at a heating rate of greater than or equal to about 90° C./hr.

3. The method of claim 2, wherein heating the green honeycomb ceramic body from room temperature to the temperature of from about 215° C. to about 250° C. comprises:
heating the green honeycomb ceramic body from room temperature to a temperature of from about 150° C. to about 205° C. at a heating rate of from greater than or equal to about 60° C./hr to less than or equal to about 80° C./hr; and
heating the green honeycomb ceramic body from the temperature of from about 150° C. to about 205° C. to the temperature of from about 215° C. to about 250° C. at a heating rate of less than or equal to about 20° C./hr.

4. The method of claim 1, wherein heating the green honeycomb ceramic body from room temperature to the first temperature comprises heating at a heating rate of greater than or equal to about 90° C./hr.

5. The method of claim 1, wherein heating the green honeycomb ceramic body from room temperature to the first temperature comprises heating at a heating rate of from greater than or equal to about 90° C./hr to less than or equal to about 150° C./hr.

6. The method of claim 1, wherein heating the green honeycomb ceramic body from the first temperature to the second temperature comprises heating at a heating rate of less than or equal to about 150° C./hr.

7. The method of claim 1, wherein the second temperature is about 900° C. and the green honeycomb ceramic body is heated from the first temperature to the second temperature at a heating rate of from greater than or equal to about 90° C./hr to less than or equal to about 125° C./hr.

8. The method of claim 1, wherein
the second temperature is less than or equal to about 1000° C., and
the method further comprises heating the green honeycomb ceramic body from the second temperature to a third temperature of greater than or equal to about 1050° C. at a heating rate sufficient to remove carbonaceous material remaining in the green honeycomb ceramic body after it has been heated to the second temperature.

9. The method of claim 8, further comprising:
heating the green honeycomb ceramic body from the third temperature to a top soak temperature;
holding the green honeycomb ceramic body at the top soak temperature; and
cooling the green honeycomb ceramic body from the top soak temperature to room temperature to form a cordierite ceramic body.

10. The method of claim 8, wherein the green honeycomb ceramic body is heated from the second temperature to the third temperature at a heating rate of less than or equal to about 20° C./hr.

11. The method of claim 8, wherein the green honeycomb ceramic body is heated from the second temperature to the third temperature at a heating rate of greater than or equal to about 60° C./hr.

12. The method of claim 1, wherein an oxygen content of an atmosphere present during heating of the green honeycomb ceramic body from room temperature to the first temperature is from about 5% to about 8%.

13. The method of claim 1, wherein an oxygen content of an atmosphere present during heating of the green honeycomb ceramic body from the first temperature to the second temperature is from about 7% to about 13%.

* * * * *

UNITED STATES PATENT AND TRADEMARK OFFICE
CERTIFICATE OF CORRECTION

PATENT NO. : 9,446,560 B2
APPLICATION NO. : 13/951802
DATED : September 20, 2016
INVENTOR(S) : David Jack Bronfenbrenner et al.

Page 1 of 1

It is certified that error appears in the above-identified patent and that said Letters Patent is hereby corrected as shown below:

On the Title Page

On page 2, in Column 1, item (56), U.S. Patent Documents, Line 1, delete "2006/0089525" and insert -- 2006/0089252 --, therefor.

Signed and Sealed this
Twenty-ninth Day of December, 2020

Andrei Iancu
*Director of the United States Patent and Trademark Office*